United States Patent [19]
Hess

[11] Patent Number: 6,105,433
[45] Date of Patent: Aug. 22, 2000

[54] SHAKER TABLE ASSEMBLY FOR A RELIABILITY TEST CHAMBER UTILIZING DIFFERENT TYPES OF VIBRATOR ASSEMBLIES

[75] Inventor: John C. Hess, Boulder, Colo.

[73] Assignee: Qualmark Corporation, Denver, Colo.

[21] Appl. No.: 09/310,443

[22] Filed: May 12, 1999

Related U.S. Application Data

[63] Continuation-in-part of application No. 09/261,090, Mar. 2, 1999.

[51] Int. Cl.$^7$ ........................................................ B06B 3/00
[52] U.S. Cl. .................................................................. 73/663
[58] Field of Search ................................................. 73/663

[56] References Cited

U.S. PATENT DOCUMENTS

| | | |
|---|---|---|
| 3,224,737 | 12/1965 | Becker . |
| 3,393,554 | 7/1968 | Tiso . |
| 3,945,246 | 3/1976 | Wadensten . |
| 4,164,151 | 8/1979 | Nolan et al. . |
| 4,181,029 | 1/1980 | Talbott et al. . |
| 4,602,555 | 7/1986 | Bushey . |
| 4,735,089 | 4/1988 | Baker et al. . |
| 4,747,693 | 5/1988 | Kahl . |
| 4,750,845 | 6/1988 | Nabetani . |
| 4,796,685 | 1/1989 | Hanneton et al. . |
| 5,024,096 | 6/1991 | Gregory et al. . |
| 5,060,151 | 10/1991 | Mikyska et al. . |
| 5,138,884 | 8/1992 | Bonavia . |
| 5,365,788 | 11/1994 | Hobbs . |
| 5,400,640 | 3/1995 | Stuckey . |
| 5,412,991 | 5/1995 | Hobbs . |
| 5,435,533 | 7/1995 | Weinmann, Jr. . |
| 5,496,167 | 3/1996 | Diaz . |
| 5,511,434 | 4/1996 | Baker et al. . |
| 5,513,538 | 5/1996 | Baker et al. . |
| 5,517,857 | 5/1996 | Hobbs . |
| 5,522,273 | 6/1996 | Baker et al. . |
| 5,535,637 | 7/1996 | Baker et al. . |
| 5,540,109 | 7/1996 | Hobbs . |
| 5,589,637 | 12/1996 | Hobbs . |
| 5,594,177 | 1/1997 | Hanse . |
| 5,637,812 | 6/1997 | Baker et al. . |
| 5,804,732 | 9/1998 | Wetzel et al. . |

*Primary Examiner*—Richard A. Moller
*Attorney, Agent, or Firm*—Emery L. Tracy

[57] ABSTRACT

A shaker table assembly for a test chamber is provided. The shaker table assembly comprises a table mechanism having a first side for mounting a product to be tested and a second side substantially opposite the first side. A first vibration mechanism is mounted to the second side of the table mechanism and a second vibration mechanism is mounted to the second side of the table mechanism wherein the first vibration mechanism is constructed differently from the second vibration mechanism.

19 Claims, 9 Drawing Sheets

SHAKER TABLE ASSEMBLY FOR A RELIABILITY TEST CHAMBER UTILIZING DIFFERENT TYPES OF VIBRATOR ASSEMBLIES

The present application is a continuation-in-part of pending patent application Ser. No. 09/261,090, filed on Mar. 2, 1999, entitled "Shaker Table Assembly for a Reliability Test Chamber".

BACKGROUND OF THE INVENTION

1. Field of the Invention

This invention relates generally to a shaker table assembly to which manufactured products are mounted for vibrational testing and, more particularly, it relates to a shaker table assembly for a test chamber which increases the low frequency response of the shaker table assembly during vibrational testing of the products.

2. Description of the Prior Art

Shaker tables for testing the reliability and durability of manufactured products are well known in the art. Such shaker tables are used either under controlled laboratory conditions or in conjunction with an assembly line. Often, shaker tables are mounted with thermal chambers, which gives the added flexibility of testing for defects in the manufactured product which can be exposed by elevated temperature or temperature cycling.

The shaker tables typically include a two-piece platform or mounting table having a top piece upon which a product to be tested is mounted and a bottom piece secured to the top piece by bonding or mechanical fasteners. At least one vibrator assembly is typically attached to the bottom piece of the mounting table by a mounting bolt and vibrates the mounting table thereby vibrating the product mounted upon the mounting table. The vibrator assembly generally consists of a housing having a slidable piston mounted therein. The slidable piston strikes a programmer comprising a shock absorbing material to achieve a predicted predetermined shock response. An accelerometer(s) mounted to the bottom piece measures the acceleration level of the mounting table in one or all orthogonal directions, e.g., the x-axis direction (in plane), the y-axis direction (in plane), and the z-axis direction (out of plane).

When testing products with a shaker table in a test chamber, it is important to maximize the acceleration level of the shaker table in all directions, e.g., the x-axis direction, the y-axis direction, and the z-axis direction, in the low frequency range, e.g., between approximately ten (10 Hz) Hertz and approximately two-hundred (200 Hz) Hertz, between approximately ten (10 Hz) Hertz and approximately one thousand (1000 Hz) Hertz, etc. Unfortunately, with the conventional shaker tables of the prior art, maximization of the acceleration level in the low frequency range is poor. In fact, the z-axis acceleration is typically low even though the z-axis acceleration is generally much greater than the acceleration along the x-axis and the y-axis.

Furthermore, it is important to measure the acceleration levels of the top plate of the mounting table since the product is mounted to the top plate. Having the accelerometer mounted to the bottom plate does not always provide an accurate measurement of the acceleration levels of the top plate. Additionally, if the accelerometer is mounted to the top plate on the same side as the product, the accelerometer is prone to damage from the operator of the test chamber during loading, testing, and unloading of the product.

A need exists for a shaker table assembly for a test chamber which maximizes the acceleration level of the shaker table in all directions, e.g., the x-axis direction, the y-axis, and the z-axis direction. Furthermore, there exists a need for a shaker table assembly for a test chamber which allows an accelerometer to be mounted to the top plate of a shaker table assembly for providing accurate measurements of the acceleration levels of the top plate. Additionally, a need exists for a shaker table assembly for a test chamber which insulates and isolates the vibrator assemblies and other components from the thermal environment within the test chamber.

SUMMARY

The present invention is a shaker table assembly for a test chamber. The shaker table assembly comprises table means having a first side for mounting a product to be tested and a second side substantially opposite the first side, first vibration means mounted to the second side of the table means, and second vibration means mounted to the second side of the table means wherein the first vibration means is different from the second vibration means.

In an embodiment of the present invention, the first vibration means is a pneumatic, reciprocating piston vibrator assembly. Furthermore, preferably, the second vibration means is a random vibration vibrator assembly.

In another embodiment of the present invention, the table means comprises a table top plate having a first side and a second side with the product being releasably securable to the first side of the table top plate, an insulation layer having a first side and a second side, the first side of the insulation layer being secured to the second side of the table top plate, and an understructure support member having a first side and a second side with the first side of the understructure support member being secured to the second side of the insulation layer.

In an embodiment of the present invention, the first side of the table top plate includes at least one groove.

In another embodiment of the present invention, the shaker table assembly further comprises means for releasably securing the product to the first side of the table top plate.

In still another embodiment of the present invention, the second side of the table top plate includes at least one cut-out portion.

In still yet another embodiment of the present invention, the top plate includes an accelerometer block on the second side of the table top plate and the shaker table assembly further comprises at least one (1) accelerometer mounted to the accelerometer block.

In still another embodiment of the present invention, the shaker table assembly further comprises a thermal barrier secured to the second side of the table top plate with the thermal barrier extending from the insulation layer to the side walls of the test chamber.

In yet another embodiment of the present invention, the understructure support member includes at least one cut-out portion.

In still yet another embodiment of the present invention, the understructure support member has at least one vibrator assembly pad for mounting each vibrator assembly thereon. Preferably, the shaker table assembly further comprises an alignment pin on the vibrator assembly pad for orienting the vibrator assembly.

The present invention further includes a method of vibrating a shaker table assembly. The method comprises providing table means having a first side and a second side, mounting first vibration means on the second side of the table means, mounting second vibration means on the second side of the table means with the first vibration means being different from the second vibration means, and activating the first vibration means and the second vibration means thereby vibrating the table means.

In another embodiment of the present invention, the table top means has a first side and a second side and the method further comprises mounting an understructure support member to the second side of the table top plate and mounting the first vibration means and the second vibration means to the second side of the understructure support member.

In still another embodiment of the present invention, the method further comprises reducing the weight of the table top plate by forming grooves in the first side of the table top plate.

In yet another embodiment of the present invention, the method further comprises mounting an insulation layer between the table top plate and the understructure support member.

In still yet another embodiment of the present invention, the method further comprises mounting an accelerometer to the second side of the table top plate.

DETAILED DESCRIPTION OF THE PREFERRED EMBODIMENTS

Figure 1:
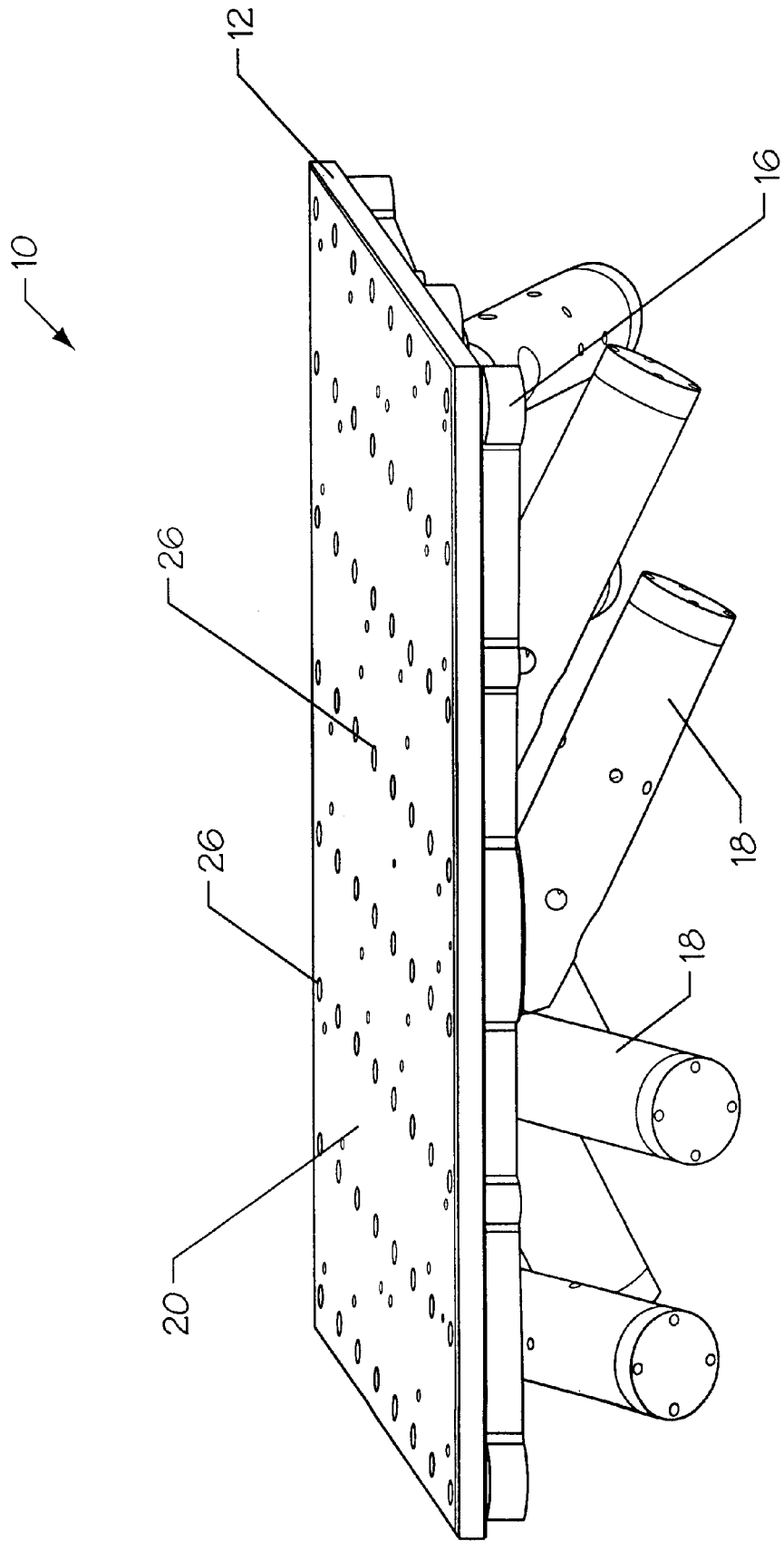
FIG. 1 is a perspective view illustrating a shaker table assembly having a table top plate, an insulation layer, and an understructure, constructed in accordance with the present invention.

As illustrated in FIG. 1, the present invention is a shaker table assembly for testing the reliability and durability of manufactured products (not shown) in a test chamber 11. The shaker table assembly 10 is mounted on a foundation 13 and is operated such that the shaker table assembly 10 and an attached testable or manufactured product is vibrated. The foundation 13 is an essentially vibration-free support for the shaker table assembly 12. Although typically supported from below, the shaker table assembly 12 can also be supported from any direction. While the shaker table assembly 10 of the present invention is a novel improvement for inclusion in a test chamber, operation and construction of the test chamber is further described in U.S. Pat. No. 5,589,637, assigned to the same assignee of the present application, and is hereby herein incorporated by reference.

Figure 2:
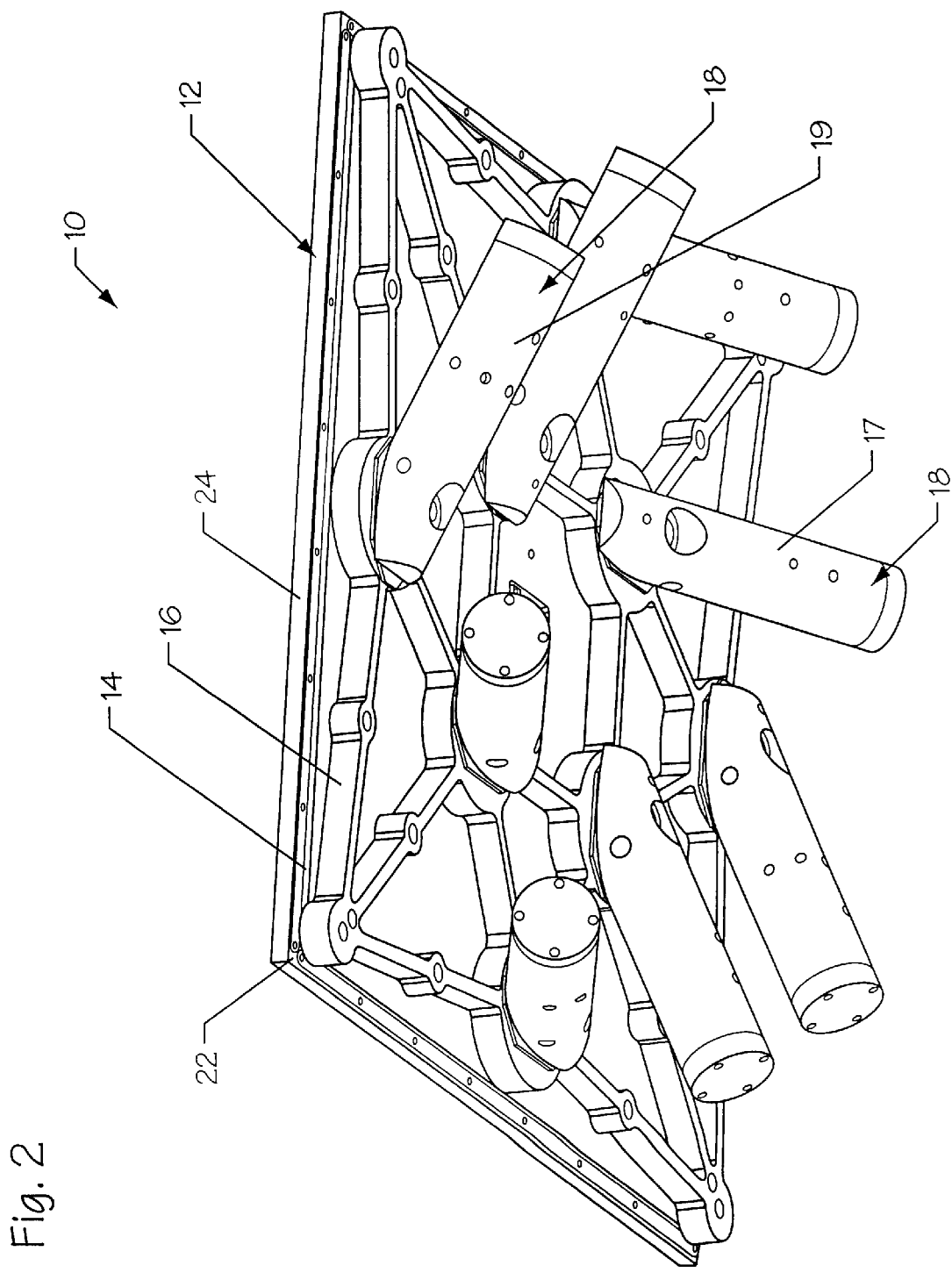
FIG. 2 is another perspective view illustrating the shaker table assembly of FIG. 1, constructed in accordance with the present invention, with the shaker table assembly utilizing at least two different types of vibrator assemblies.
Figure 3:
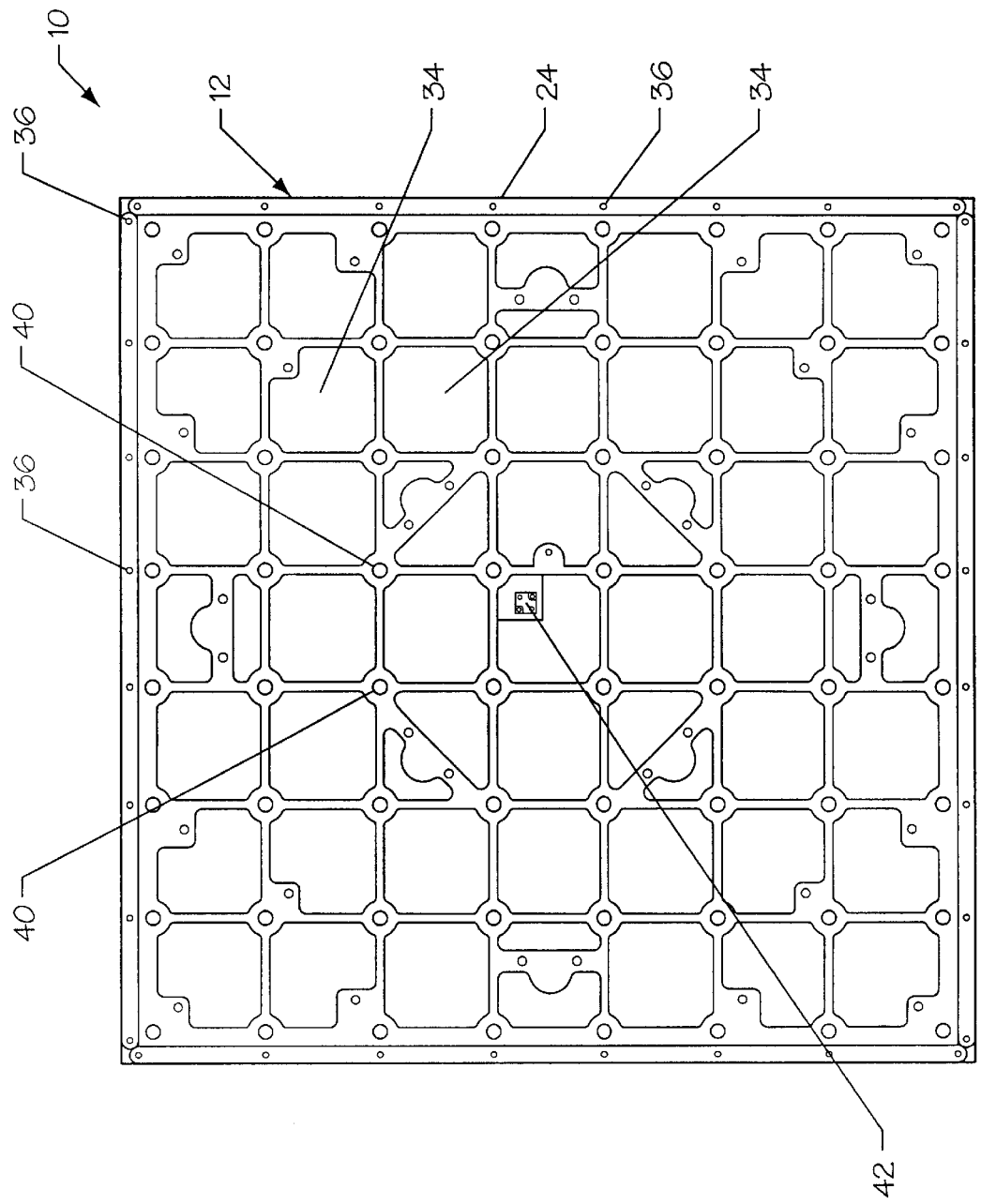
FIG. 3 is a bottom plan view illustrating a table top plate of the shaker table assembly of FIG. 1, constructed in accordance with the present invention, with the insulation layer, the understructure support member, and the vibrator assemblies removed from the table top plate of the shaker table assembly.

Referring to FIG. 2, the shaker table assembly 10 of the present invention includes a table top plate 12, an insulation layer 14, an understructure support member 16, and at least one vibrator assembly 18, with the insulation layer 14 secured between the table top plate 12 and the understructure support member 16. As illustrated in FIGS. 2 and 3, the table top plate 12 has a first top side 20, a second bottom side 22 substantially opposite the first top side 20, and an outer table top plate edge 24 between the first top side 20 and the second bottom side 22.

Figure 9:
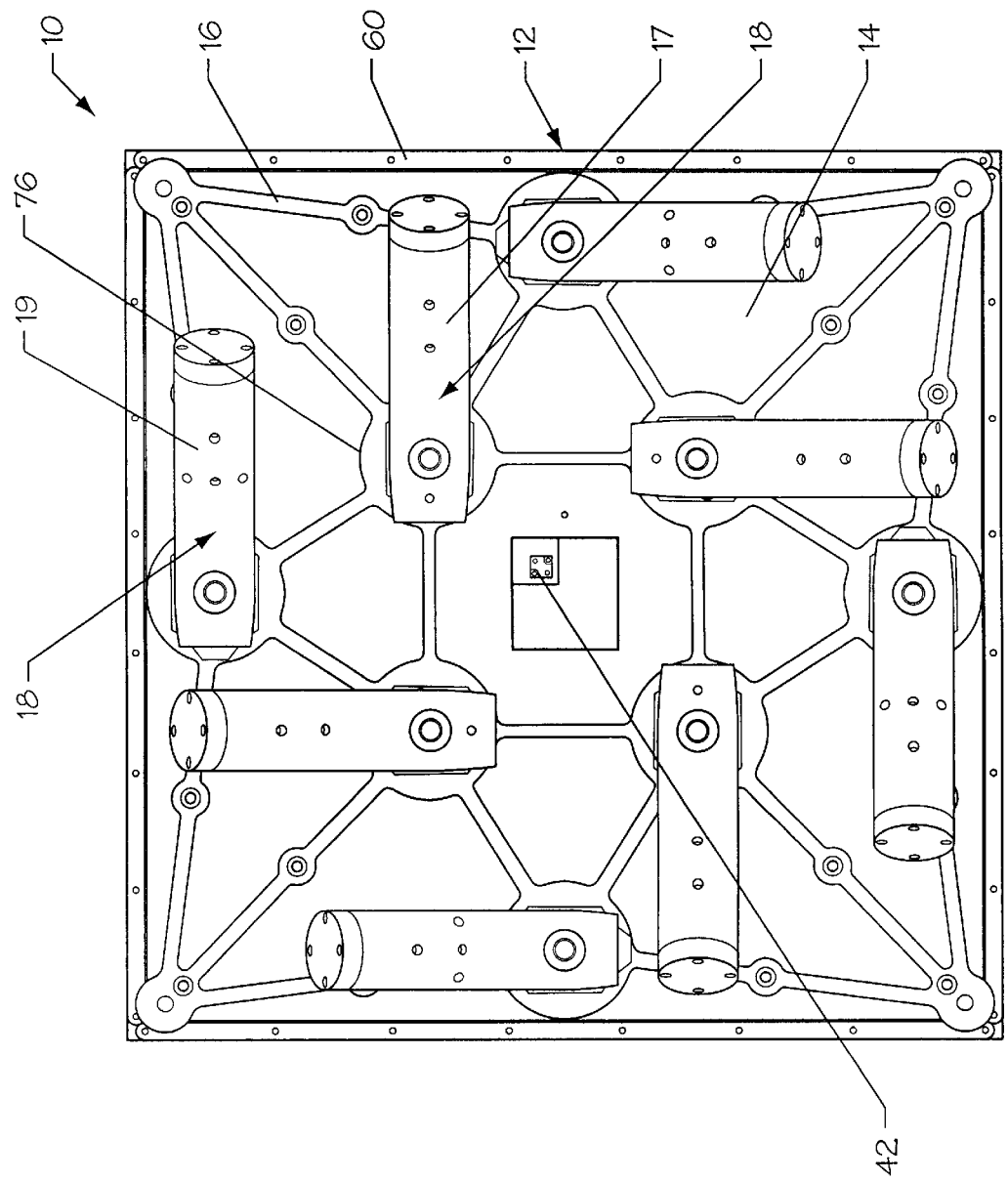
FIG. 9 is a bottom plan view illustrating the shaker table assembly of FIG. 1, constructed in accordance with the present invention, with the two different types of vibrator assemblies mounted to the understructure support member.

Still referring to FIG. 2, and also referring to FIG. 9, the vibrator assembly 18 can be any type of vibration assembly for shaking the shaker table assembly 10. The vibrator assembly 18 can be a pneumatic, reciprocating piston vibrator 17 equipped with a low acceleration piston as described in U.S. Ser. No. 09/081,280, filed on May 18, 1998, assigned to the same assignee of the present application, and which is hereby herein incorporated by reference. Furthermore, the vibrator assembly 18 can be a dual piston pneumatic random vibration vibrator 19 for use in mechanical vibration generation as described in U.S. Pat. No. 5,493,944 which is hereby herein incorporated by reference.

It should be noted that with the shaker table assembly 10 of the present invention, more than one type of vibrator assembly 18 can be separately or simultaneously used for vibrating the shaker table assembly. In fact, the shaker table assembly 18 can separately or simultaneously utilize both the pneumatic, reciprocating piston vibrator 17 and the true random vibration vibrator 19. Simultaneously utilizing more than two different types of vibrator assemblies 18, e.g., three or more different vibrator assemblies 18, is also within the scope of the present invention.

The first top side 20 of the table top plate 12 includes a plurality of spaced product hold-down apertures 26 for allowing the products to be tested to be releasably secured to the first top side 20 of the table top plate 12. The table top plate 12 of the shaker table assembly 10 is interchangeable within the test chamber 11 to accommodate a wide variety of products. For instance, the product hold-down apertures 26 can be spaced in an four (4") inch by four (4") inch array. If a different spacing is desired or required by the product to be tested, the table top plate 12 can be interchanged by removing and replacing with a table top plate 12 having product hold-down apertures 26 either with spacing greater than four (4") inches by four (4") inches or with spacing less than four (4") inches by four (4") inches.

Figure 4:
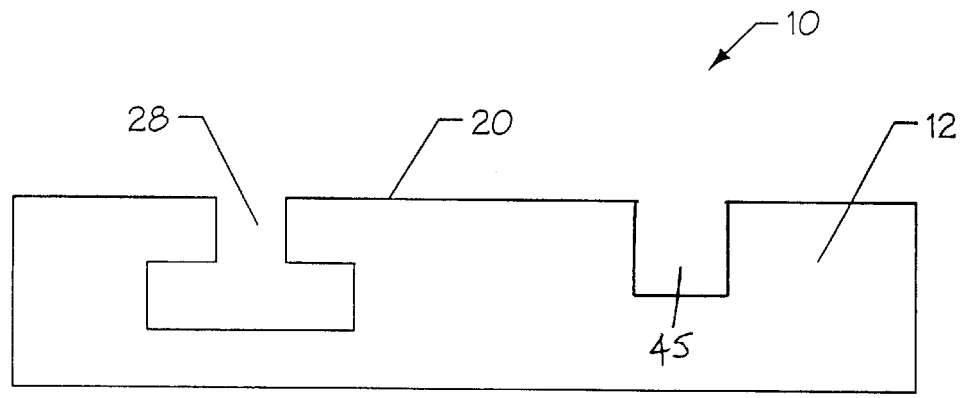
FIG. 4 is a sectional view illustrating another embodiment of the shaker table assembly, constructed in accordance with the present invention, having a T-slot formed in the table top plate for releasably securing a product to the table top plate.
Figure 5:
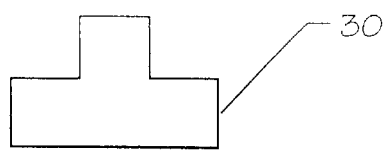
FIG. 5 is a side view illustrating a T-shaped mounting piece releasably slidably receivable within the T-slot, constructed in accordance with the present invention.
Figure 6:
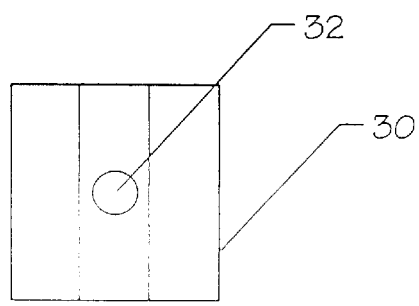
FIG. 6 is a top plan view illustrating the T-shaped mounting piece of FIG. 5, constructed in accordance with the present invention.

As illustrated in FIG. 4, in another embodiment of the table top plate 12 of the shaker table assembly 10 of the present invention, the table top plate 12 includes at least one T-slot 28 formed in the first top side 20 of the table top plate 12. Preferably, the T-slots 28 extend the entire length of the table top plate 12. As illustrated in FIG. 5, a T-shaped mounting piece 30 sized and configured is releasably slidable within and along the entire length of the T-slot 28. As illustrated in FIG. 6, each T-shaped mounting piece 30 includes a threaded product hold-down aperture 32 for allowing the products to be tested to be releasably secured to the first top side 20 of the table top plate 12 with a threaded screw, bolt or the like (not shown). As the threaded screw is tightened into the threaded product hold-down aperture 32, the T-shaped mounting piece 30 is drawn in generally upward direction against the interior surfaces of the T-slot 28 to maintain the desired position of the T-shaped mounting piece 30 relative to the T-slot 28. Therefore, the T-shaped mounting piece 30 can be moved along the T-slot 28 to accommodate and releasably secure a wide variety of products to be tested to the first top side 20 of the table top plate 12 at any desired location on the first top side 20 of the table top plate 12.

Preferably, the table top plate 12 of the shaker table assembly 10 has dimensions of approximately thirty (30") inches wide by approximately thirty (30") inches long by approximately one-half (½") inch thick and is constructed from an aluminum material, e.g., AL 6061. It should be noted, however, that is within the scope of the present invention to construct the table top plate 12 with dimensions greater than approximately thirty (30") inches wide by approximately thirty (30") inches long by approximately one-half (½") inch thick and less than approximately thirty (30") inches wide by approximately thirty (30") inches long by approximately one-half (½") inch thick. Furthermore, it is also within the scope of the present invention to construct the table top plate 12 from materials other than an aluminum material.

As illustrated in FIG. 3, the second bottom side 22 of the table top plate 12 includes a plurality of patterned cut-outs 34 to reduce the weight of the shaker table assembly 10 thereby increasing the acceleration levels in the low frequency range. It should be noted that it is preferable that the patterned cut-outs 34 in the second bottom side 22 of the table top plate 12 do not extend through the first top side 20 of the table top plate 12, although having patterned cut-outs 34 in the second bottom side 22 of the table top plate 12 which do extend through the first top side 20 of the table top plate 12 is within the scope of the present invention.

In order to accomplish the maximum acceleration levels in the x-axis direction, the y-axis direction, and the z-axis direction at the low frequency ranges, the inventor of the present application has discovered that it is important to reduce the weight of the shaker table assembly 10. Achieving the maximum acceleration levels in the low frequency ranges with the shaker table assembly 10 of the present invention will be discussed in further detail below.

The second bottom side 22 of the table top plate 12 further includes a plurality of thermal barrier mounting apertures 36 for mounting a thermal barrier 38 to the table top plate 12 and a plurality of insulation layer and understructure support member mounting apertures 40. The thermal barrier mounting apertures 36 and the insulation layer and understructure support member mounting apertures 40 allow the thermal barrier 38 and the insulation layer 14 and the understructure support member 16, respectively, to be mounted to the table top plate 12, as will be discussed in further detail below.

The second bottom side 22 of the table top plate 12 also includes an accelerometer block 42 for mounting at least one accelerometer (not shown) directly to the table top plate 12. Since the shaker table assembly 10 of the present invention has six (6) directions or degrees of freedom, e.g., linear acceleration in the x-axis direction, the y-axis direction, and the z-axis direction, and rotational acceleration in the x-axis direction, the y-axis direction, and the z-axis direction. The accelerometer measures the acceleration levels in all linear acceleration directions and, using appropriate sensors, rotational acceleration directions to allow the operator to control the testing of the product mounted to the shaker table assembly 10. With the shaker table assembly 10 of the present invention, up to three (3) accelerometers can be secured to the table top plate 12 to measure the acceleration levels in the three (3) linear directions.

It is within the scope of the present invention to include grooves 45, as illustrated in FIG. 4, in the first top side 20 of the table top plate 12. The grooves 45 further reduce the weight of the shaker table assembly 10 to improve the acceleration levels in the x-axis direction and the y-axis direction relative to the acceleration level in the z-axis direction.

Figure 7:
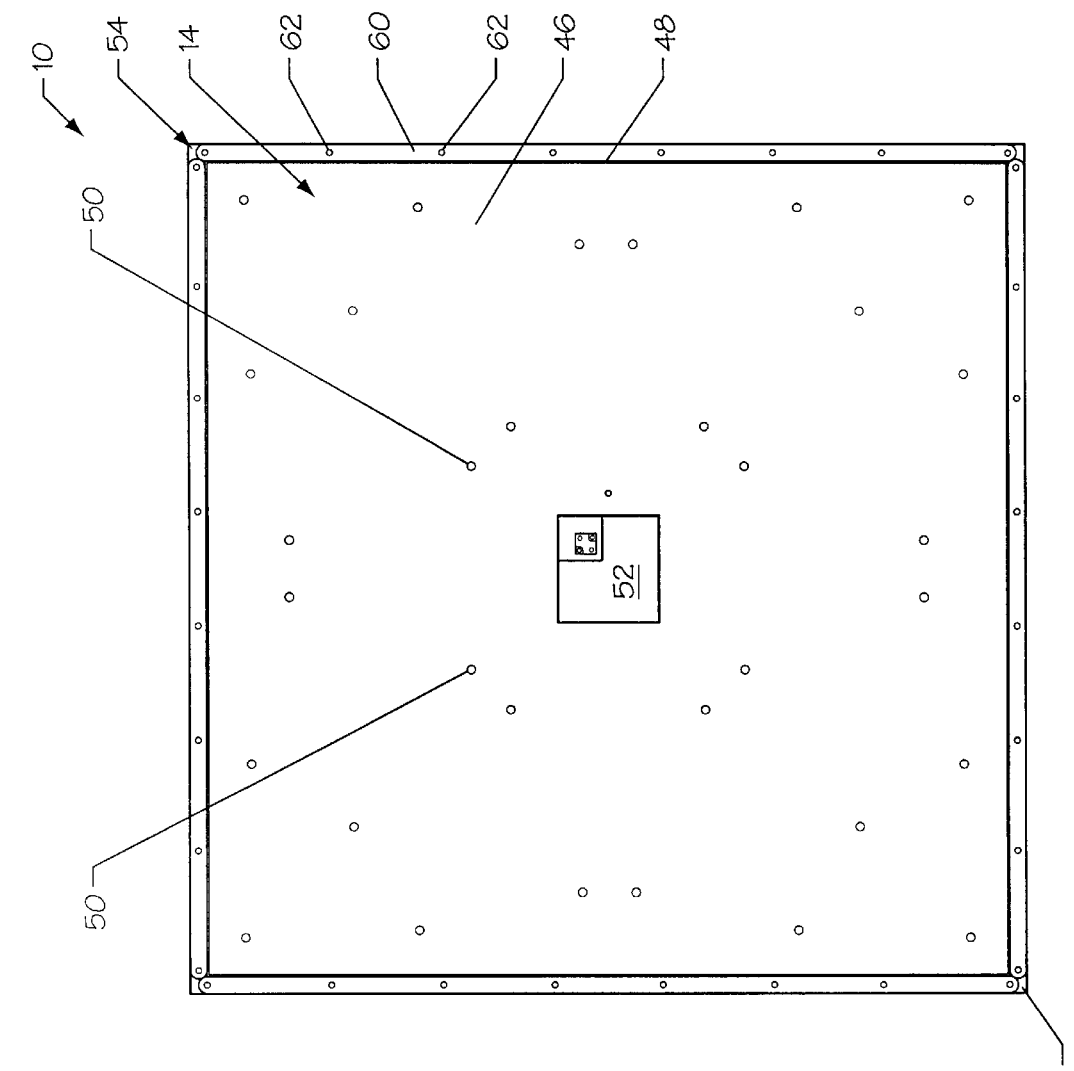
FIG. 7 is a bottom plan view illustrating the shaker table assembly of FIG. 1, constructed in accordance with the present invention, with the insulation layer mounted to the table top plate of the shaker table assembly.

As illustrated in FIG. 7, the shaker table assembly 10 of the present invention further includes the insulation layer 14 having a first insulation side (not shown), a second insulation side 46 substantially opposite the first insulation side, and an outer insulation layer edge 48 between the first insulation side and the second insulation side 46. The insulation layer 14 is releasably secured to the second bottom side 22 of the table top plate 10 with the first insulation side of the insulation layer 14 contacting the second bottom side 22 of the table top plate 12. The insulation layer 14 includes a plurality of mounting apertures 50 aligned with the insulation layer mounting apertures 40 in the second bottom side 22 of the table top plate 12 for allowing the insulation layer 14 to be releasably secured to the table top plate 12. Furthermore, the insulation layer 14 includes an aperture 52 aligned with the accelerometer block 42 on the second bottom side 22 of the table top plate 12 for receiving the accelerometer block 42.

In a preferred embodiment, the insulation layer 14 has dimensions less than the dimensions of the table top plate 12. Preferably, the insulation layer 14 has dimensions of approximately twenty-nine (29") inches wide by approximately thirty (29") inches long by approximately one-quarter (¼") inch thick and is constructed from an glass composite material, e.g., GLASTIC®, which enhances the low frequency response of the shaker table assembly 10. It should be noted, however, that is within the scope of the present invention to construct the insulation layer 14 with dimensions greater than approximately twenty-nine (29") inches wide by approximately twenty-nine (29") inches long by approximately one-quarter (¼") inch thick and less than approximately twenty-nine (29") inches wide by approximately twenty-nine (29") inches long by approximately one-quarter (¼") inch thick. Furthermore, it is also within the scope of the present invention to construct the insulation layer 14 from materials having insulative characteristics other than a glass composite material.

The insulation layer 14 is preferably mounted to the table top plate 12 such that the table top plate 12 overlaps the insulation layer 14 in approximately equal amounts. The overlap of the table top plate 12 relative to the insulation layer 14 creates an overlap space 54 on the second bottom side 22 of the table top plate 12.

Still referring to FIG. 7, the shaker table assembly 10 of the present invention also includes the thermal barrier 38, mentioned briefly above, having a first barrier side 56 and a second barrier side 58 substantially opposite the first barrier side 58. At least a portion of the first barrier side 56 of the thermal barrier 38 is positioned against the second bottom side 22 of the table top plate 12 in the overlap space 54 adjacent the outer insulation layer edge 48 of the insulation layer. A plurality of strips 60 are positioned against at least a portion of the second barrier side 58 of the thermal barrier 38. A plurality of screws or other fastening mechanisms (not shown) are threadably secured within the barrier mounting apertures 36 in the second bottom side 22 of the table top plate 12 through mounting apertures 62 in the strips 60 and mounting apertures 64 in the thermal barrier 38 thereby releasably securing the thermal barrier 38 to the second bottom side 22 of the table top plate 12.

The thermal barrier 38 of the shaker table assembly 10 preferably extends substantially from the outer insulation layer edge 48 of the insulation layer 14 beyond the outer table top plate edge 24 of the table top plate 12 to the walls 15 of the test chamber 11. The thermal barrier 38 and the insulation layer 14 are environmental barriers which inhibits thermal transfer from the area within the test chamber 11 adjacent the product to the vibrator assemblies 18 and the area within the test chamber 11 beneath the thermal barrier. By inhibiting thermal transition, less energy is required to heat and cool the product to the predetermined levels during testing of the product.

Furthermore, the thermal barrier 38 is preferably constructed from a silicon impregnated glass sheet material. It should be noted, however, that it is within the scope of the present invention to construct the thermal barrier 38 from materials other than a silicon impregnated glass sheet material.

Figure 8:
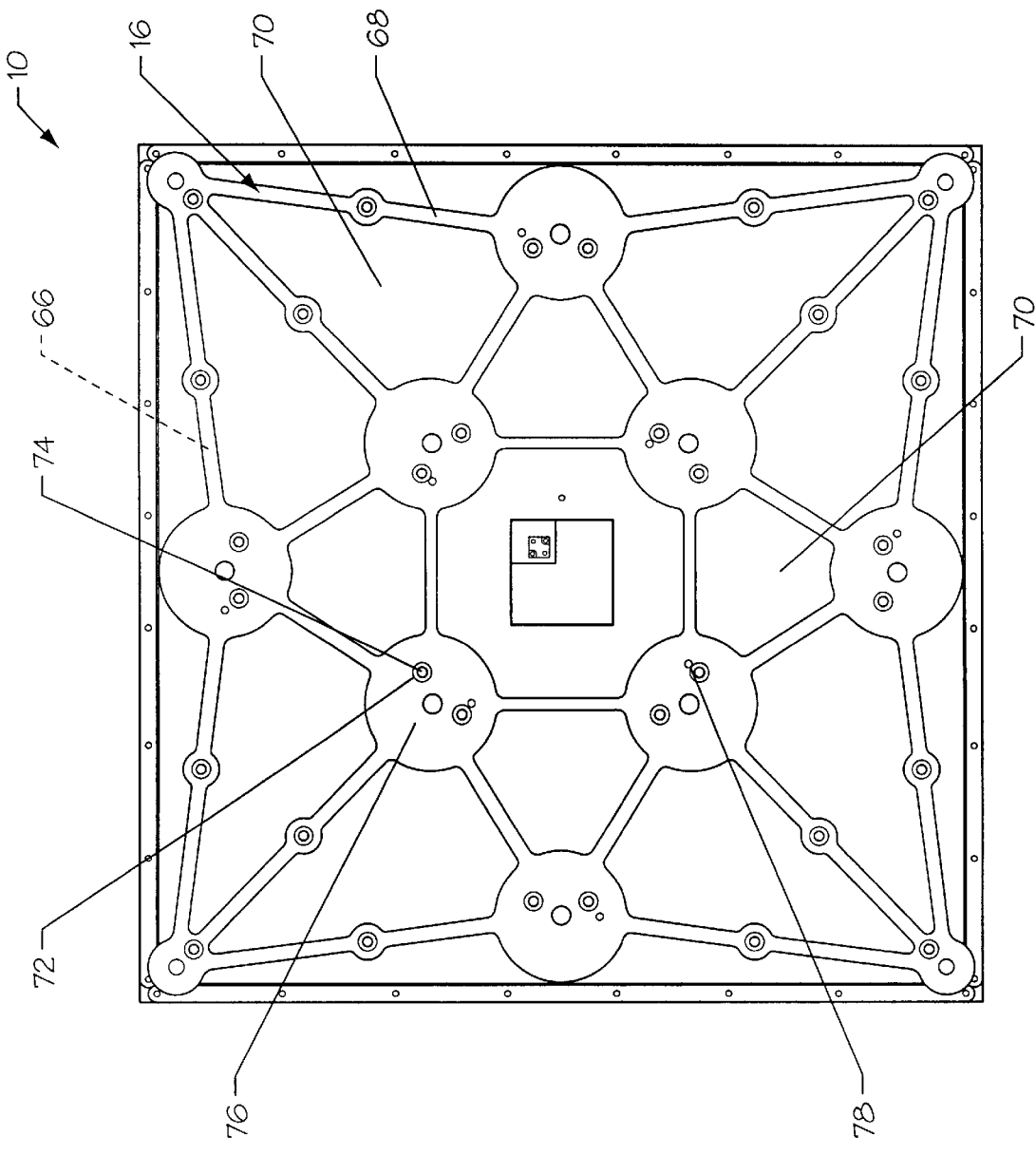
FIG. 8 is a bottom plan view illustrating the shaker table assembly of FIG. 1, constructed in accordance with the present invention, with the understructure support member mounted to the insulation layer of the shaker table assembly.

As illustrated in FIG. 8, the shaker table assembly 10 of the present invention additionally includes the relatively stiff understructure support member 16 which operates as the primary load bearing component of the shaker table assembly 10. The understructure support member 16 has a first understructure side 66 and a second understructure side 68 substantially opposite the first understructure side 66 with the first understructure side 66 of the understructure support member 16 being positioned against the second insulation side 46 of the insulation layer 14 for releasably securing the understructure support member 16 to the insulation layer 14 and the table top plate 12. A plurality of cut-out sections 70 are formed completely through the understructure support member 16 for reducing the overall weight of the shaker table assembly 10.

To releasably secure the understructure support member 16 to the insulation layer 14 and the table top plate 12, the understructure support member 16 has a plurality of apertures 72 formed therein and extending therethrough. A plurality of screws or other fastening mechanisms 74 are threadably mounted to the second bottom side 22 of the table top plate 12 through the apertures 72 in the understructure support member 16, through the mounting apertures 50 in the insulation layer 14, and into the insulation layer and understructure support member mounting apertures 40 in the second bottom side 22 of the table top plate 12.

Preferably, the understructure support member 16 has dimensions less than the dimensions of the table top plate and is constructed from an aluminum material, e.g. AL 6061 T6. It should be noted, however, that is within the scope of the present invention to construct the understructure support member 16 with dimensions equal to or less than the dimensions of the table top plate 12 and from material other than an aluminum material.

The understructure support member 16 further includes at least one vibrator assembly mounting pad 76 for securing the vibrator assembly 18 thereon (FIG. 9). Each of the mounting pads 76 includes an alignment pin 78 receivable within a corresponding alignment aperture (not shown) within the vibrator assembly 18. Since changing the orientation of the vibrator assembly 18 relative to the understructure support member 16 changes the characteristics, including acceleration levels, of the shaker table assembly 10 during operation, the alignment pin 78 on the mounting pad 76 assists in maintaining the proper desired orientation of the vibrator assembly 18 when mounted to the understructure support member 16 and in maintaining a consistent vibration profile between different shaker table assemblies 10.

As illustrated in FIG. 9, the shaker table assembly 10 of the present invention further includes at least one vibrator assembly mounted to the vibrator assembly mounting pad on the second understructure side of the understructure support to shake and vibrate the product releasably secured to the first top side of the table top plate. The vibrator assembly of the shaker table assembly 10 can be any device which imparts excitation and a shock response in the table top plate of the shaker table assembly 10. Preferably, the vibrator assembly is a pneumatic air operated vibrator, although other types of vibrator assemblies are within the scope of the present invention. The shaker table assembly 10 can accommodate a wide variety of vibrator assemblies and can accommodate different vibrator assemblies simultaneously.

An interposer (not shown) can be releasably secured between the vibrator assemblies 18 and the second understructure side 68 of the understructure support 16. The interposers are preferably constructed from a silicon material which optimizes the elasticity of the vibrator assemblies 18 during operation of the shaker table assembly 10 and improves the low frequency response of the shaker table assembly 10. The interposers and operation of the interposers in relation to the vibrator assemblies 18 are described in U.S. patent application Ser. No. 09/185,327, filed on Nov. 3, 1998, assigned to the same assignee as the present application, and is hereby herein incorporated by reference.

Figure 10:
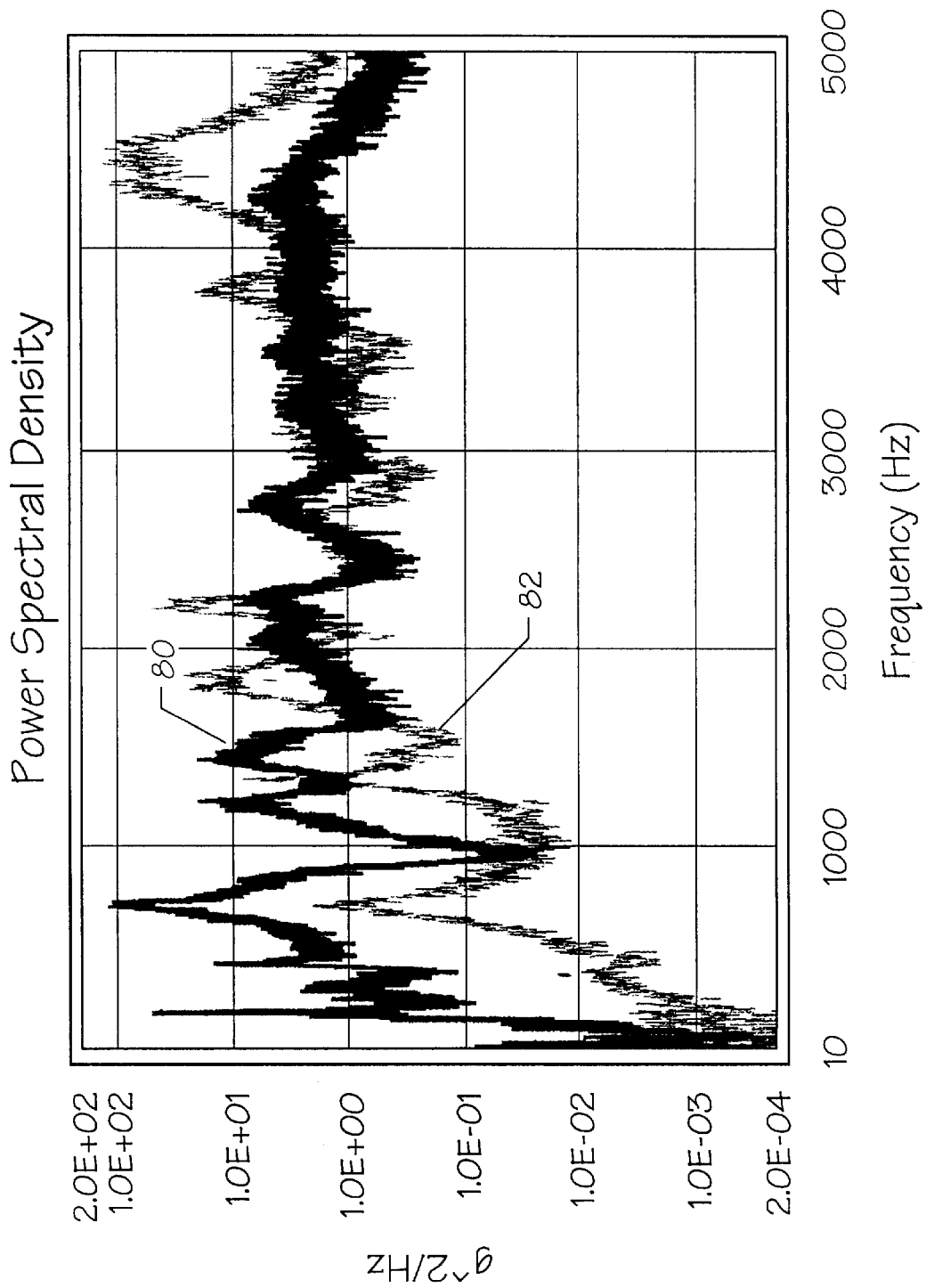
FIG. 10 is a graph illustrating acceleration level versus frequency for a shaker table assembly, constructed in accordance with the present invention, as compared to a prior art conventional shaker table assembly.
Figure 11:
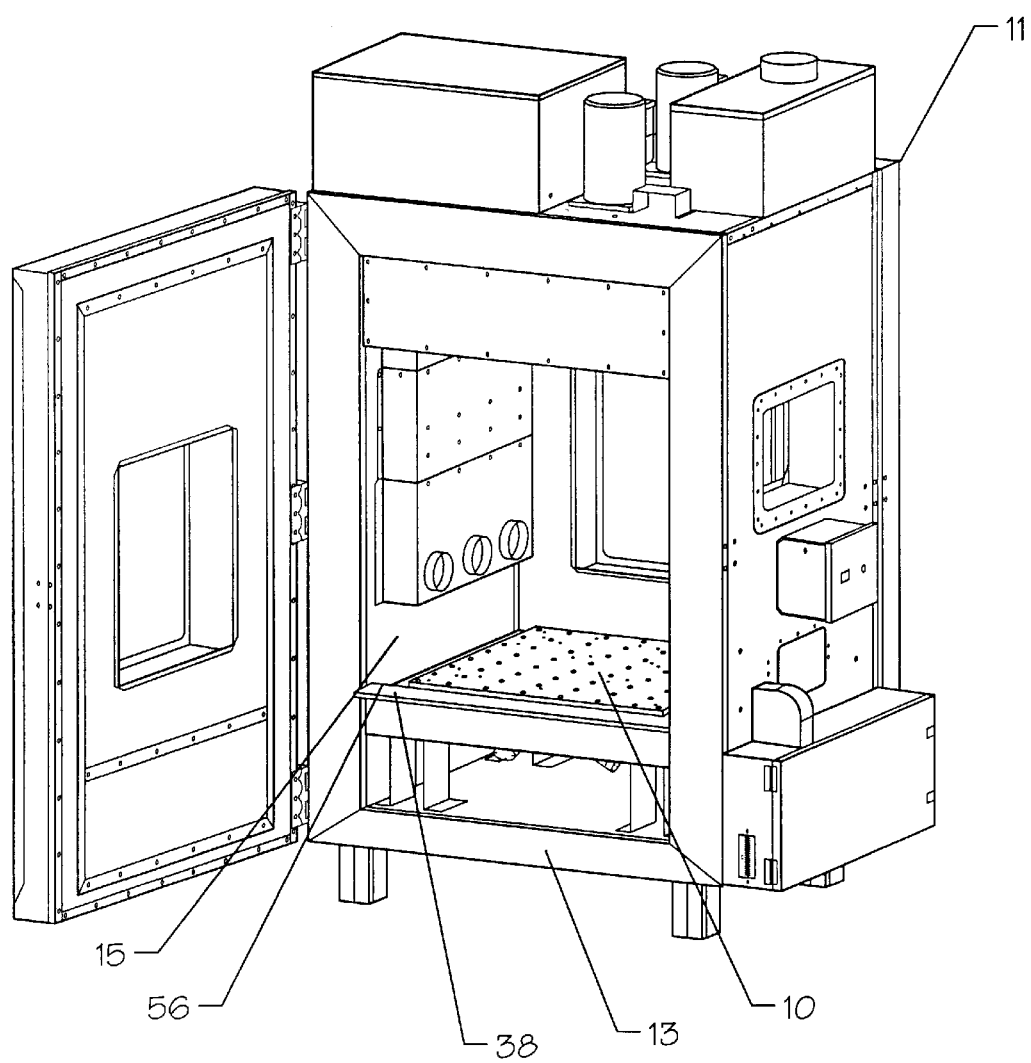
FIG. 11 is a perspective view illustrating a test chamber incorporating the shaker table assembly of FIG. 1 constructed in accordance with the present invention.

Achieving maximum acceleration in the low frequency ranges is important in the testing of products. As illustrated in FIG. 10, the shaker table assembly 10 of the present invention has decreased weight to increase the low frequency response, especially in the axis direction of the shaker table assembly 10. Line 80 represents the low frequency response of the shaker table assembly 10 of the present invention while line 82 represents a conventional shaker table. Maximum acceleration levels are realized in six (6) directions in the x-axis direction, the y-axis direction, and the -axis direction. Furthermore, the acceleration levels in the x-axis direction and the y-axis direction are increased relative to the z-axis direction.

The shaker table assembly 10 further provides mounting the accelerometers directly to the table top plate 12. By mounting the accelerometers directly to the table top plate 12, more accurate readings of the acceleration levels can be obtained to provide better testing of the products mounted thereon. Furthermore, with the shaker table assembly 10 of the present invention, the accelerometer is protected from the mounting, testing, and dismounting of the product while still providing accurate information regarding the acceleration levels.

The shaker table assembly 10 of the present invention is interchangeable within existing test chambers. Therefore, the shaker table assembly 10 can be obtained in a kit form for users without incurring the expense of purchasing a new test chamber.

The shaker table assembly 10 of the present invention is particular beneficial for testing products in both a highly accelerated life test testing (HALT®) and highly accelerated stress screen testing (HASS®). HALT® testing is an engineering level test run on product prototypes to determine where the product prototype fails prior to manufacturing of the product. HASS® testing is a manufacturing level screening test conducted on all manufactured product units to determine which product units will fail before reaching the consumer. With both of these testing types, maximum acceleration levels in the low frequency ranges is important. The shaker table assembly 10 of the present invention achieves the maximum acceleration levels in the low frequency ranges throughout the testing of the product.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A shaker table assembly for a test chamber, the shaker table assembly comprising:
    table means having a first side for mounting a product to be tested and a second side substantially opposite the first side;
    first vibration means mounted to the second side of the table means; and
    second vibration means mounted to the second side of the table means;
    wherein the first vibration means is constructed differently from the second vibration means.

2. The shaker table assembly of claim 1 wherein the first vibration means is a pneumatic, reciprocating piston vibrator assembly.

3. The shaker table assembly of claim 1 wherein the second vibration means is a dual piston pneumatic random vibration vibrator assembly having a freely movable programmer.

4. The shaker table assembly of claim 1 and further comprising at least one additional vibration means, each additional vibration means being constructed differently from the first vibration means, the second vibration means, and each other additional vibration means.

5. The shaker table assemble of claim 1 wherein the table means comprises:
    a table top plate having a first side and a second side, the product being secured to the first side of the table top plate;
    an insulation layer having a first side and a second side, the first side of the insulation layer being secured to the second side of the table top plate; and
    an understructure support member having a first side and a second side, the first side of the understructure support member being secured to the second side of the insulation layer.

6. The shaker table assembly of claim 5 wherein the first side of the table top plate includes at least one weight-reducing groove.

7. The shaker table assembly of claim 5 and further comprising means for releasably securing the product to the first side of the table top plate.

8. The shaker table assembly of claim 5 wherein the second side of the table top plate includes at least one cut-out portion.

9. The shaker table assembly of claim 5 wherein the top plate includes an accelerometer block on the second side of the table top plate, further comprising at least one (1) accelerometer mounted to the accelerometer block.

10. The shaker table assembly of claim 5 and further comprising a thermal barrier secured to the second side of the table top plate, the thermal barrier extending from the insulation layer to the side walls of the test chamber.

11. The shaker table assembly of claim 5 wherein the understructure support member includes at least one cut-out portion.

12. The shaker table assembly of claim 5 wherein the understructure support member has at least one vibrator assembly pad for mounting each vibrator assembly thereon.

13. The shaker table assembly of claim 12 and further comprising an alignment pin on the vibrator assembly pad for orienting the vibrator assembly.

14. A method of vibrating a shaker table assembly, the method comprising:
    providing table means having a first side and a second side;
    mounting first vibration means on the second side of the table means;
    mounting second vibration means on the second side of the table means, the first vibration means being constructed differently from the second vibration means; and
    activating the first vibration means and the second vibration means thereby vibrating the table means.

15. The method of claim 14 and further comprising mounting at least one additional vibration means on the second side of the table means, each additional vibration means being constructed differently from the first vibration means, the second vibration means, and each other additional vibration means.

16. The method of claim 14 wherein the table top means has a first side and a second side, the method further comprising:
    mounting an understructure support member to the second side of the table top plate; and
    mounting the first vibration means and the second vibration means to the second side of the understructure support member.

17. The method of claim 16 and further comprising reducing the weight of the table top plate by forming weight-reducing grooves in the first side of the table top plate.

18. The method of claim 16 and further comprising mounting an insulation layer between the table top plate and the understructure support member.

19. The method of claim 16 and further comprising mounting an accelerometer to the second side of the table top plate.

* * * * *